United States Patent [19]

Blanchard et al.

[11] 3,851,852

[45] Dec. 3, 1974

[54] AERIAL REFUELING NOZZLE

[75] Inventors: Roger H. Blanchard, Newport Beach; Charles R. Clark, Mission, both of Calif.

[73] Assignee: Parker-Hannifin Corporation, Cleveland, Ohio

[22] Filed: Aug. 16, 1972

[21] Appl. No.: 281,002

[52] U.S. Cl....... 251/149.1, 137/614.04, 244/135 A
[51] Int. Cl............................................. F16l 37/28
[58] Field of Search.......... 137/614, 614.01, 614.02, 137/614.03, 614.04, 614.05, 614.06; 285/302; 244/135 A

[56] References Cited
UNITED STATES PATENTS

| | | | |
|---|---|---|---|
| 2,892,608 | 6/1959 | Collins | 251/86 X |
| 2,946,605 | 7/1960 | Mosher | 137/614.03 |
| 3,059,895 | 10/1962 | Brown | 137/614.03 X |
| 3,352,332 | 11/1967 | Swatek et al. | 137/614.04 X |
| 3,475,001 | 10/1969 | Hieber | 137/614.03 X |

*Primary Examiner*—William R. Cline
*Assistant Examiner*—Ira S. Lazarus
*Attorney, Agent, or Firm*—Diller Brown Ramik & Wight

[57] ABSTRACT

A refueling nozzle having a slidably mounted valve sleeve engageable with a valve seat carried by a rod adjacent a protruding nose. The valve seat being slidable on the rod so that the valve seat and sleeve may be moved, while maintaining a sealing relationship with each other, to take up the gap between the locking elements and the sleeve. Further, the rod is supported remote from the nose for limited movement in all angular directions to compensate for misalignment of the nose with a companion part of an associated drogue. The valve sleeve is slidably mounted in the nozzle body by a bearing member which also serves to retain in place latch elements for retaining the valve sleeve in a latched sealing engagement with the valve seat.

12 Claims, 7 Drawing Figures

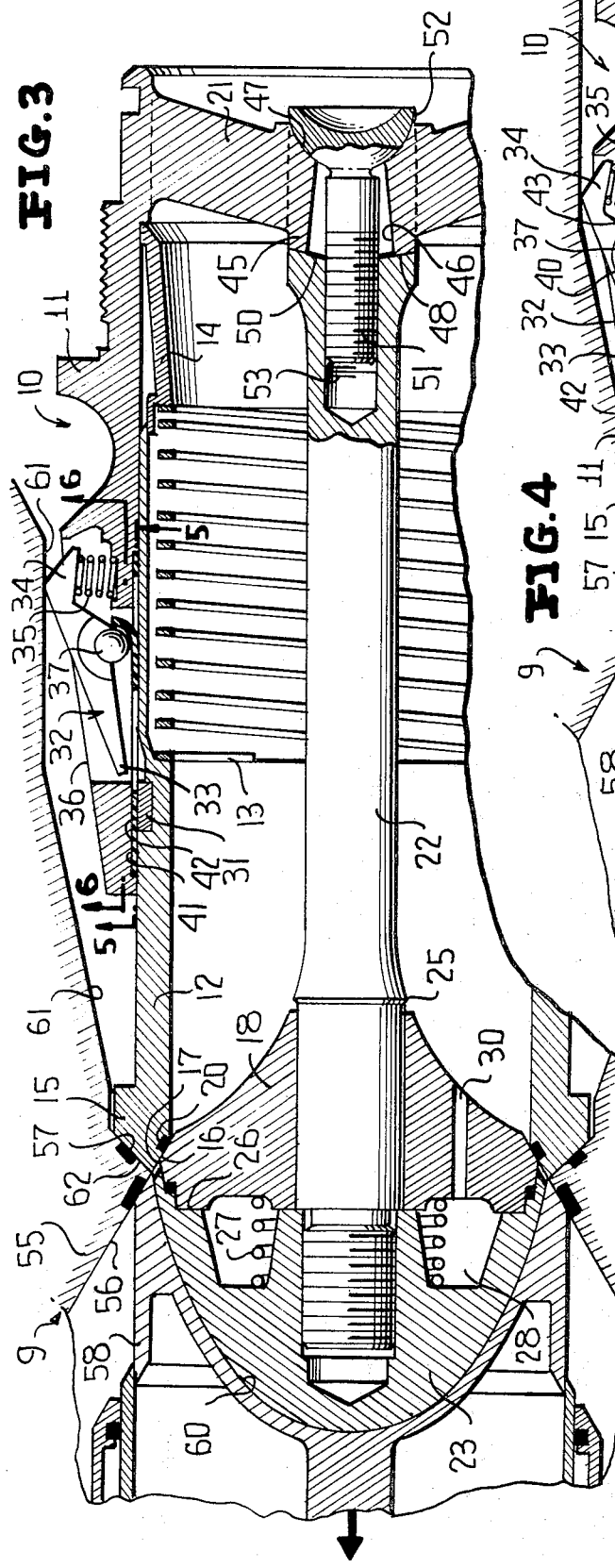
FIG.3
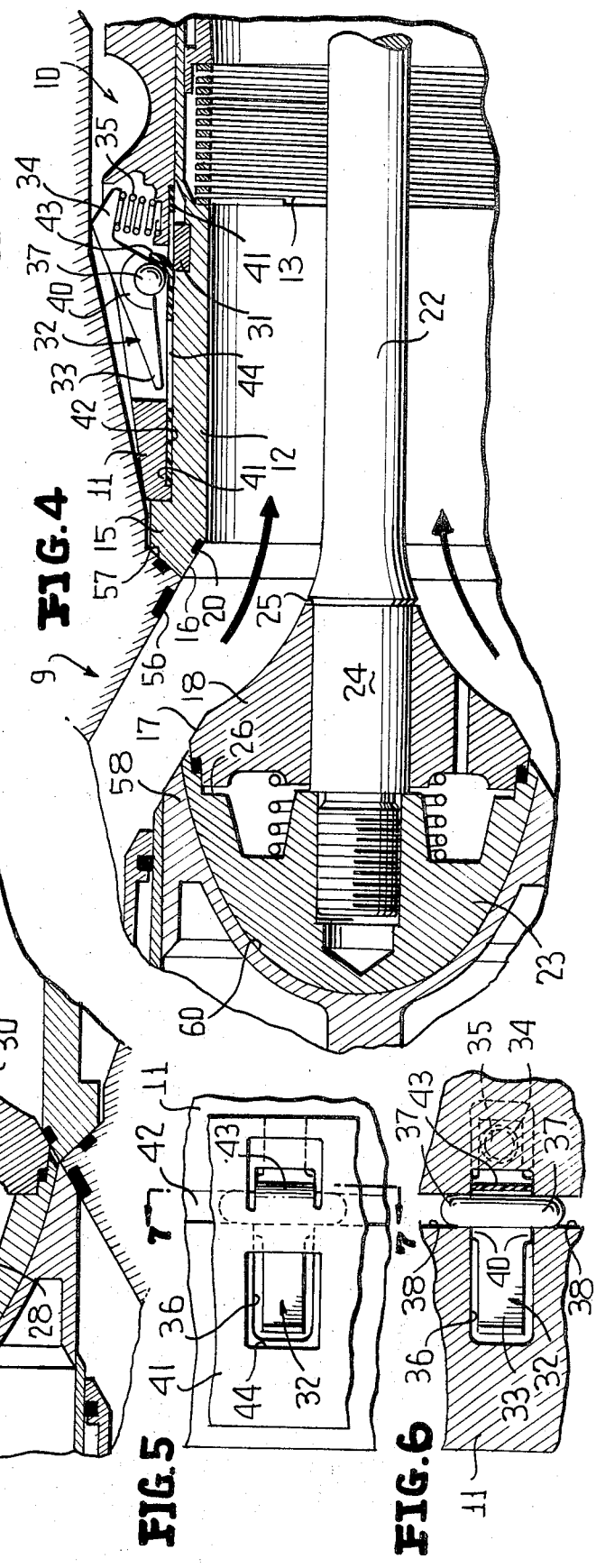
FIG.4
FIG.5
FIG.6

AERIAL REFUELING NOZZLE

This invention relates to new and useful improvements in aerial refueling nozzles.

BACKGROUND OF THE INVENTION

It is well known to provide an aerial refueling nozzle, generally referred to as a probe, which is provided with a nose for engaging a valve element of a drogue and effect the automatic opening thereof. Such nozzles include a body and a valve sleeve slidably therein with the sleeve engaging a valve seat associated with the nose to normally seal the nozzle against outflow. Latch elements are provided for engaging the valve sleeve and locking the same in a closed position except when the latch elements are actuated by the insertion of the nozzle into the drogue. Nozzles of the general type are disclosed in U.S. Pat. Nos. 2,946,605; 3,059,895; 3,352,332 and 3,475,001.

SUMMARY OF THE INVENTION

The probe of the present invention has the ability to maintain its closed and sealed condition when bumped by anything other than a drogue with certain camming surfaces therein. The end of the probe has a seating surface that is movable and is spring biased. Thus, the sealing surface will follow the sealing element when said element is bumped.

The nose is supported relative to the nozzle body by an elongated rod or stem in cantilever relation. When the nozzle is associated with a drogue, the nose is seated within a valve element of the drogue and during the disengagement of the nozzle and drogue, there is a tendency for the two to become disposed in angular relation which exerts considerable stress on the stem.

In accordance with this invention, the nose is permitted to move to a limited degree with the valve element of the drogue by mounting the stem in a manner to permit the stem to swivel a limited degree. To this effect, a swivel connection is provided between the stem and a support of the nozzle body.

A further feature of the invention is the use of a simple flat sheet of bearing material, such as tetrafluoroethylene, between the nozzle body and valve sleeve as a bearing. The same bearing sheet is utilized to retain the latch elements within the body.

With the above and other objects in view that will hereinafter appear, the nature of the invention will be more clearly understood by reference to the following detailed description, the appended claims and the several views illustrated in the accompanying drawings:

IN THE DRAWINGS

FIG. 3 is an enlarged fragmentary longitudinal sectional view taken through the nozzle and drogue with the same in interconnected association but prior to the communication of the two.

FIG. 4 is a fragmentary sectional view similar to FIG. 3 and shows the nozzle and drogue in communication.

FIG. 5 is a fragmentary sectional view taken along the line 5—5 of FIG. 3 and shows generally the mounting of one of the latch elements.

FIG. 6 is a fragmentary sectional view taken along the line 6—6 of FIG. 3 and shows further the details of the mounting of the latch element.

Figure 1:
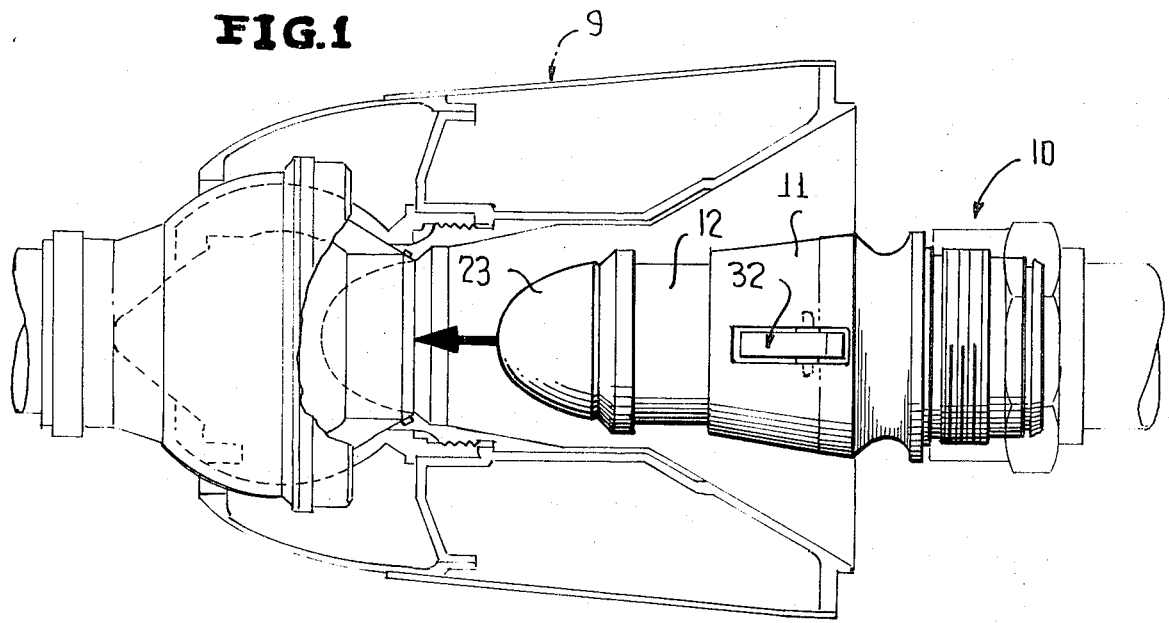
FIG. 1 is a schematic view showing the nozzle as it begins to enter into the drogue, the drogue being shown in phantom lines for purposes of clarity.
Figure 2:
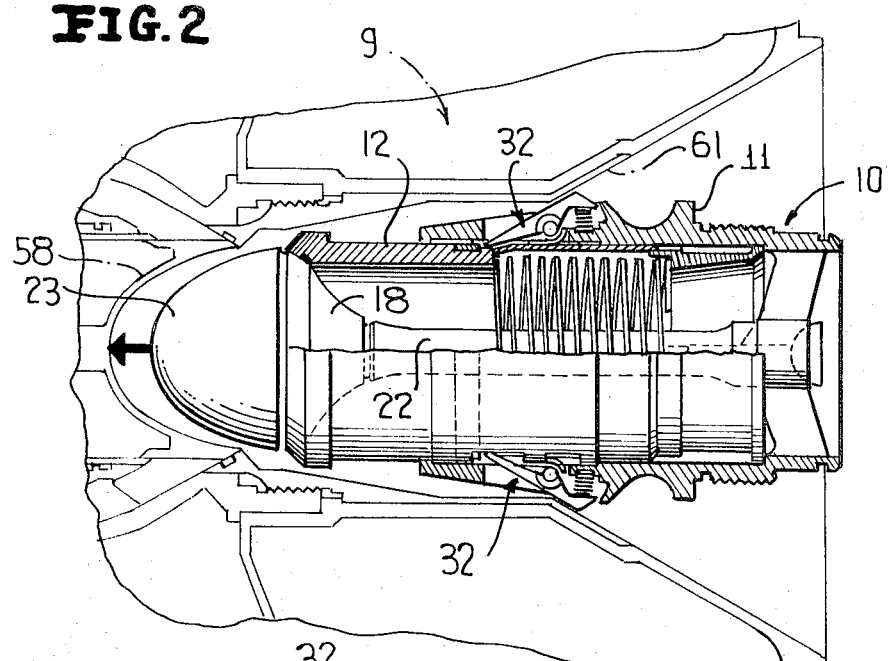
FIG. 2 is a view somewhat similar to FIG. 1, but with portions of the nozzle broken away and shown in section and with the nozzle more fully entered into the drogue.

Referring now to FIGS. 1 and 2 in particular, it will be seen that there is illustrated a nozzle or probe 10 formed in accordance with this invention associated with a conventional drogue 9. The specific cooperation between the nozzle 10 and the drogue 9 will be described in more detail hereinafter after a description of the details of the nozzle 10. Referring now to FIGS. 3 and 4 in particular, it will be seen that the nozzle 10 includes a body 11 whic has slidably mounted therein and in projecting relation a valve sleeve 12. The valve sleeve 12 is constantly urged towards a projecting position by means of spring 13 which bears at opposite ends thereof against valve sleeve 12 and sleeve member 14.

The projecting end of valve sleeve 12 includes a head 15 having a seating surface 16 engageable with a seating surface 17 of a valve seat 18. The seating surface 16 may be provided with a suitable seal 20.

Nozzle body 11 is provided adjacent the right end thereof with a spider-like support 21 which carries a forwarding projecting stem or rod 22. Fixedly threaded on the left end of stem 22 is a nose 23 with which valve seat 18 is associated. Stem 22 has a cylindrical portion 24 immediately adjacent nose 23 on which valve seat 18 is slidably mounted for limited movement between a position abutting nose 23 and a position aububting a stop shoulder 25 on stem 22.

Valve seat 18 is internested with nose 23 at 26 and is sealed relative thereto against fluid loss by packing 27. A seal is normally formed between valve sleeve 12, valve seat 18 and nose 23.

Spring 27 is disposed between valve seat 18 and nose 23. Spring 27 biases valve seat 18 toward stop shoulder 25.

Spring 27 is mounted in an annular cavity 28. In order that fluid may be relieved therefrom, a vent passage 30 is provided between cavity 28 and interior of valve sleeve 12. Entrapped fluid within cavity 28 also slightly cushions return movement of valve seat 18.

Valve sleeve 12 is provided with a stop ring 31 engageable by a plurality of latch elements 32 spaced peripherally around body 11. Latch elements 32 are of the lever type and each has a nose 33 engageable with ring 31 and a foot 34 engaged by a spring 35 seated against nozzle body 11 and urging pivoting of latch element 32 in a counterclockwise direction.

To avoid losing the seal between seating surfaces 16 and 17 when sleeve 12 is bumped by something other than the drogue 9, sleeve 12 seals on valve seat 18 as long as there is a gap between valve seat 18 and stop 25. Thus when sleeve 12 is bumped, it can travel to take up the clearance gap between latch elements 32 and stop ring 31 without losing the seal between surfaces 16 and 17.

Figure 7:
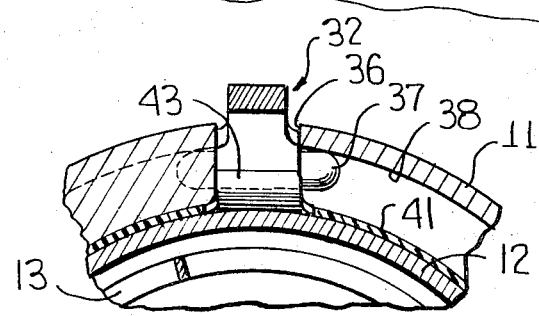
FIG. 7 is a fragmentary sectional view taken alont the line 7—7 of FIG. 5 and shows still further details of the latch element mounting.

With reference to FIGS. 5, 6 and 7, each latch element 32 is seated in a narrow slot 36 opening through nozzle body 11. Each latch element 32 has trunnions 37 extending from opposite sides thereof with trunnions 37 being seated in circumferentially extending annular groove 38. Groove 38 opens radially into the interior of nozzle body 11. In order to prevent cocking of each latch element 32 in its respective opening 36, in the area of the trunnions 37, latch element 32 has projecting shoulders 40 which closely fit within the respective opening 36, as shown in FIG. 6.

Prior to positioning valve sleeve 12, latch elements 32 may be inserted into places through the interior of nozzle body 11. Thereafter, a sleeve type bearing 41 is placed within nozzle body 11, retaining latch elements 32 in place. Bearing 41 also functions as a bearing for valve sleeve 12 permitting freedom of sliding movement thereof relative to nozzle body 11.

It is to be understood that in the preferred form, bearing sleeve 41 is in the form of a flat sheet of tetrafluoroethylene and that the same is merely formed to a generally cylindrical configuration and then snapped into place within a seat 42 formed internally in nozzle body 11. Ears 43 may be struck from bearing 41 into openings 36, as shown in FIG. 6 preventing rotation of bearing 41.

After bearing sleeve 41 has been inserted, valve sleeve 12 and spring 13 may be assembled with nozzle body 11.

As shown in FIG. 4, bearing 41 has openings 44 for passage of noses 33 therethrough into locking engagement with ring 31 to hold valve sleeve 12 in its projected position.

In its cooperation with drogue 9, nose 23 may be urged towards a temporarily displaced position, normally placing a bending stress on stem 22 and support 21. In order to prevent this stem 22 is mounted for swivel movement relative to support 21 and nozzle body 11 in the manner shown in FIG. 3. Support 21 includes a central portion 45 having a tapered bore 46 therethrough opening into an enlarged part spherical seat 47. Central portion 45 terminates at the enlarged end of opening 46 in a spherical surface 48 having substantially the same radius of curvature as spherical surface or seat 47.

Right end of stem 22 terminates in a part spherical surface 50 mating with surface 48. A fastener 51 with a part spherical head 52 is threaded into bore 53 in stem 22 and when tightened head 52 seats within seat 47 and surfaces 48, 50 abut. The connection between stem 22 and support 21 is relatively tight, but permits movement of nose 23 in any necessary direction, except axially.

Referring now to FIGS. 3 and 4, it will be seen that drogue 9 includes receiver body 55 having oppositely facing valve seats 56, 57. Drogud 9 also includes valve member 58 normally engageable with valve seat 56 for forming a seal therewith. Valve member 58 is of a recessed construction and defines a seat 60 for nose 23.

Receiver body 55 also includes cam surface 61 engageable with foot portion 34 of each latch element 32 when nozzle 10 and drogue 9 are telescoped.

As nozzle 10 enters into drogue 9, nose 23 enters into seat 60 and valve surface 62 of valve sleeve 12 engages valve seat 57. Prior to this time, cam surface 61 has pivoted latch elements 32 to positions releasing valve sleeve 12. As nozzle 10 enters further into drogue 9 to a fully seated position, nose 23 moves valve member 58 to an open position and seal is formed between valve sleeve 12 and valve seat 57. Nozzle 10 continues to move into the drogue 9 until nozzle body 11 abuts head 15 of valve sleeve 12. Dispensing of fluid from drogue 9 into the nozzle 10 may be accomplished at this time.

When drogue 9 and nozzle 10 separate, drogue 9 and nozzle 10 may become disposed in angularly related position with the result that due to the internesting of nose 23 with valve member 58, nose 23 may be shifted from its centrally located position. This is now permitted due to the swivel mounting of stem 22.

As nozzle 10 is rapidly withdrawn from drogue 9, valve sleeve 12 will slam against valve seat 18 with conical configuration of surfaces 16 and 17 effecting automatic realignment of valve seat 18 as well as stem 22 and the nose 23.

When latch elements 32 move out of engagement with cam surface 61, springs 35 will pivot latch elements 32 into locking engagement with ring 31, locking valve sleeve 12 in its projecting position in seated engagement with valve seat 18.

Although only a preferred embodiment of the nozzle has been specifically illustrated and described herein, it is to be understood that minor variations may be made in the construction of the nozzle without departing from the spirit and scope of the invention, as defined by the appended claims.

What is claimed as new:

1. In a dispensing head of the type including a nose, a valve seat associated with said nose, and a valve sleeve resiliently urged towards engagement with said valve seat for sealing against flow and relatively movable to an open position to permit flow around said valve seat and said nose, the improvement comprising mounting means mounting said valve seat for limited axial movement relative to said nose, and means resiliently urging said valve seat away from said nose towards said valve sleeve for maintaining the sealing engagement between said valve sleeve and said valve seat when said sleeve is accidentally bumped.

2. The dispensing head of claim 1 wherein said mounting means includes a rod having said nose mounted thereon in a relatively fixed position, and said valve seat being slidably mounted on said rod.

3. The dispensing head of claim 2 together with cooperating stop surfaces on said valve seat and said rod limiting movement of said valve seat away from said nose.

4. The dispensing head of claim 1 wherein the means resiliently urging said valve sleeve towards said valve seat is of a greater force than said means resiliently urgins said valve seat away from said nose.

5. The dispensing head of claim 1 wherein sealing means peripherally seal said valve seat relative to said nose, and vent means venting the space between said valve seat and said nose to assure freedom of return of said valve seat by said valve sleeve.

6. In a dispensing head of the type having a nose seatable in a valve member during the coupling of said dispensing head with a drogue and wherein said nose is carried by an elongated rod, the improvement comprising mounting means mounting said rod and the nose carried thereby for limited pivoting movement relative to its longitudinal axis permitting pivotal displacement of said nose to compensate for misalignment of said dispensing head and an associated valve member, said mounting means including a support having a spherical seat, a spherical surface carried by said rod for seating on said spherical seat, and retaining means retaining said spherical surface seated against said spherical seat.

7. The dispensing head of claim 6 wherein said retaining means includes mating surfaces on said support and said rod remote from said spherical seat.

8. The dispensing head of claim 6 wherein said retaining means includes mating surfaces on said support and said rod remote from said spherical seat, and said spherical surface is axially adjustable relative to said mating surface on said rod.

9. In a dispensing head of the type including a body, a sleeve slidably mounted in said body, and latch elements carried by said body for locking said sleeve in a predetermined position, the improvement comprising single means forming bearing means for said sleeve and retaining said latch elements in said body, said means is in the form of a bearing sleeve between said body and said sleeve, and said bearing sleeve has retaining means thereon for retaining latch elements in place.

10. The dispensing head of claim 9 wherein said bearing sleeve being in the form of a flat sheet shaped within said body and has at least one ear struck therefrom and interlocked with said body and preventing said bearing sleeve from moving.

11. In a dispensing head of the type including a body, a sleeve slidably mounted in said body, and latch elements carried by said body for locking said sleeve in a predetermined position, the improvement comprising single means forming bearing means for said sleeve and retaining said latch elements in said body, each latch element has trunnions projecting therefrom, said body has a socket receiving said trunnions, a one direction access opening into said socket, and said means being a retainer engaging each latch element and restraining the same against retraction of said trunnions from the respective socket.

12. The dispensing head of claim 11 wherein said means is in the form of a bearing sleeve between said body and said sleeve, and said sockets open towards said sleeve.

* * * * *